United States Patent [19]

Imura et al.

[11] Patent Number: 5,135,690
[45] Date of Patent: Aug. 4, 1992

[54] PROCESS FOR PRODUCING CYLINDRICAL REINFORCING FIBROUS MOLDING

[75] Inventors: Takeshi Imura, Hatoyama; Masaki Sakakibara, Kawagoe; Takahiro Suenaga, Tokorozawa; Shigeo Kaiho, Oomiya; Kanji Murata, Tokorozawa; Hitoshi Karasawa, Ageo; Kazuya Sakamoto, Iruma; Masahiro Inoue, Tsurugashima; Masanobu Ishikawa; Takashige Hara, both of Hidaka, all of Japan

[73] Assignee: Honda Giken Kogyo Kabushiki Kaisha, Tokyo, Japan

[21] Appl. No.: 6,697

[22] Filed: Jan. 22, 1987

[30] Foreign Application Priority Data

Jan. 22, 1986 [JP] Japan .................. 61-11611
Jan. 22, 1986 [JP] Japan .................. 61-11612
Feb. 18, 1986 [JP] Japan .................. 61-33386
Aug. 19, 1986 [JP] Japan .................. 193399
Sep. 26, 1986 [JP] Japan .................. 227412

[51] Int. Cl.$^5$ ............... B28B 1/38; B29C 59/02; C04B 35/64; F27B 9/04
[52] U.S. Cl. .................. 264/59; 264/63; 264/66; 264/87; 264/119; 264/125; 264/221; 264/296; 264/301; 264/304; 264/306; 264/317; 264/337; 264/338; 264/517; 264/571; 264/DIG. 44
[58] Field of Search ....... 264/221, 317, 313, DIG. 44, 264/59, 517, 63, 86, 66, 87, 571, 119, 125, 126, 294, 296, 301, 306, 316, 332, 337, 338, 304; 249/62, 61; 164/349, 369

[56] References Cited

U.S. PATENT DOCUMENTS

| | | | |
|---|---|---|---|
| 958,997 | 5/1910 | Dunton | 264/221 |
| 1,648,149 | 11/1927 | Reeve | 264/59 |
| 1,769,455 | 7/1930 | Pickering | 164/369 |
| 2,171,006 | 8/1939 | Morgan et al. | 264/59 |
| 2,401,760 | 6/1946 | Heyroth | 264/221 |
| 2,474,186 | 6/1949 | Marks | 164/369 |
| 2,485,798 | 10/1949 | Whyte et al. | 249/61 X |
| 2,554,327 | 5/1951 | Gravley | 264/59 |
| 2,628,394 | 1/1953 | Valyi | 264/59 |
| 2,974,388 | 3/1961 | Ault | 264/59 |
| 3,066,365 | 12/1962 | Moore | 249/62 |
| 3,090,094 | 5/1963 | Schwartzwalder et al. | 264/59 |
| 3,123,886 | 3/1964 | Miller, Jr. | 264/59 |
| 3,133,133 | 5/1964 | Fairbanks | 264/59 |
| 3,275,497 | 9/1966 | Weiss et al. | 264/59 |
| 3,433,282 | 3/1969 | Crocker et al. | 164/369 X |
| 3,437,723 | 4/1969 | Habermann | 264/59 |
| 3,526,266 | 9/1970 | Snelling | 164/349 |
| 3,758,653 | 9/1973 | Patel et al. | 264/59 X |
| 3,907,949 | 9/1975 | Carlson | 264/59 X |
| 3,923,940 | 12/1975 | Hujii et al. | 264/59 |
| 4,086,311 | 4/1978 | Huseby et al. | 264/221 |
| 4,209,482 | 6/1980 | Schwarz | 264/221 X |
| 4,225,544 | 9/1980 | Dantzig et al. | 264/59 X |
| 4,265,665 | 5/1981 | Bedell | 164/369 X |
| 4,578,826 | 4/1986 | Adiletta | 264/571 X |
| 4,591,470 | 5/1986 | Goto et al. | 264/59 |

FOREIGN PATENT DOCUMENTS

0046520 3/1982 European Pat. Off. ............. 264/59
0221379 11/1985 Japan ................................. 264/59

*Primary Examiner*—Karen Aftergut
*Attorney, Agent, or Firm*—Ladas & Parry

[57] ABSTRACT

A process for producing a cylindrical reinforcing fibrous molding by sealing openings at opposite ends of a porous cylindrical disintegratable mold, immersing the mold into an aqueous solution of a molding material containing reinforcing fibers and an inorganic binder, and depositing the molding material onto the outer peripheral surface of the mold by applying suction within the mold to form a molding blank; pressing the molding blank against the mold to adjust the shape of the molding blank; disintegrating the mold to remove it from the blank; and heating the molding blank to partially bond the reinforcing fibers with the inorganic binder.

10 Claims, 8 Drawing Sheets

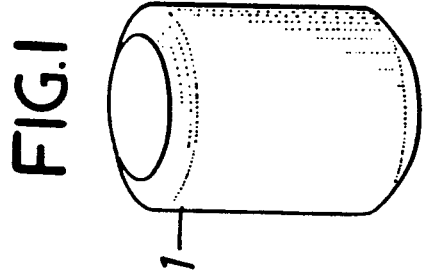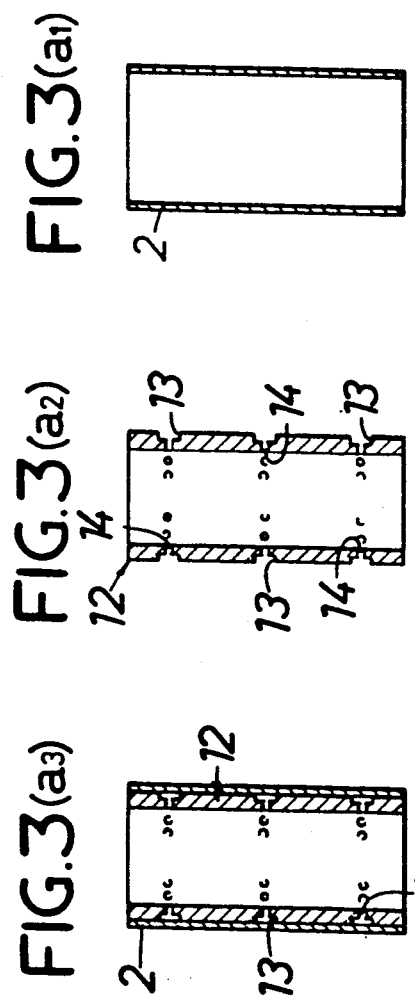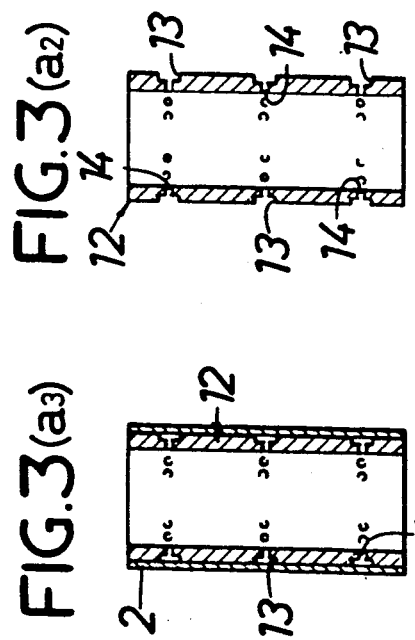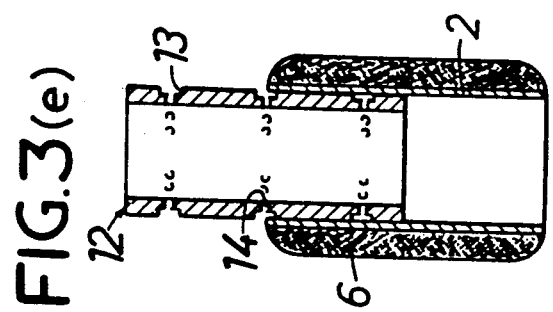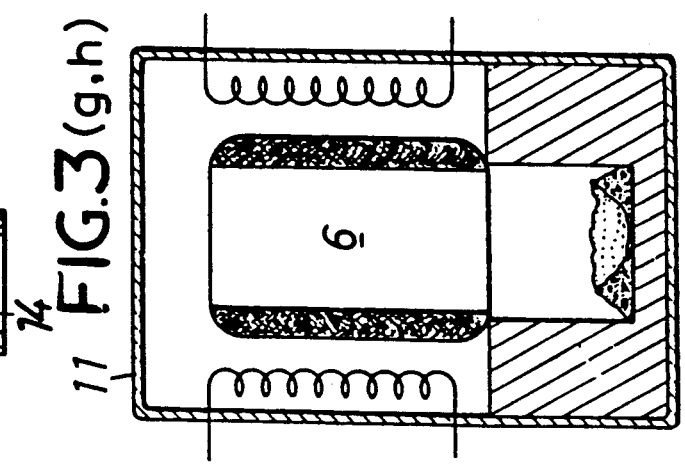

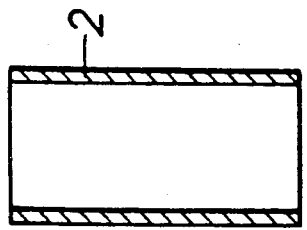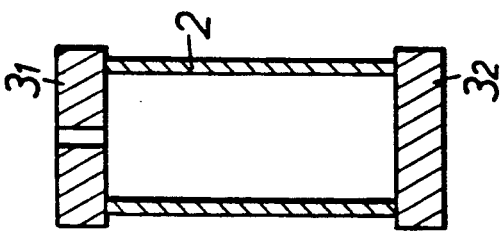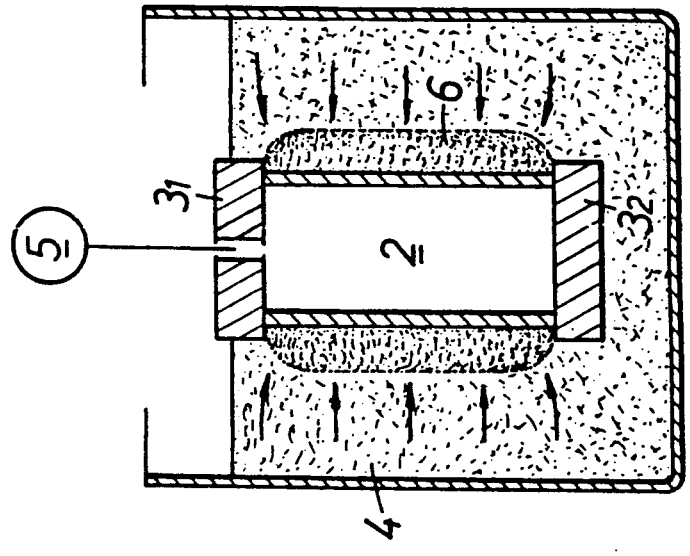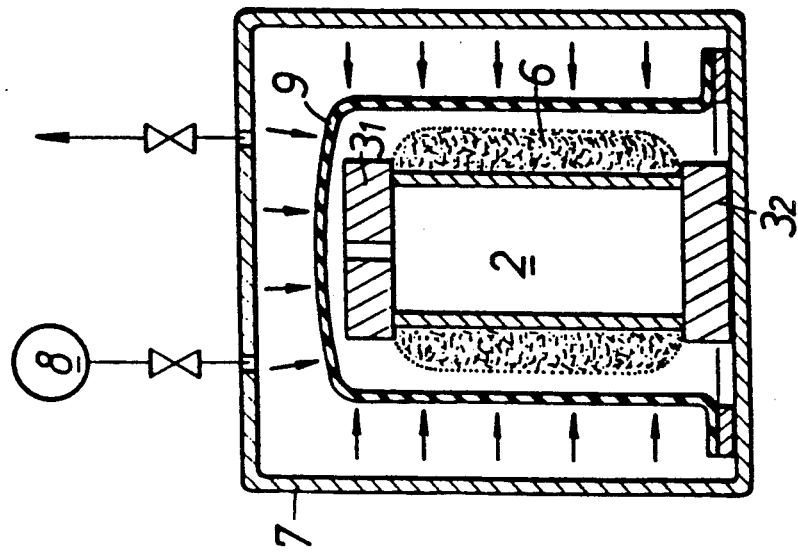

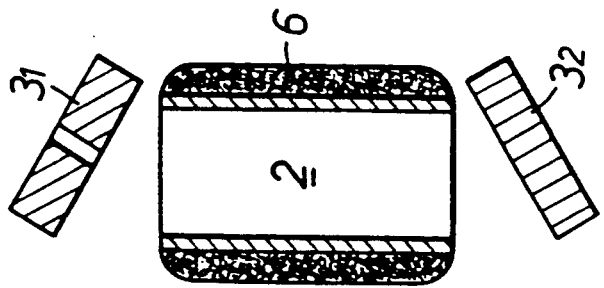
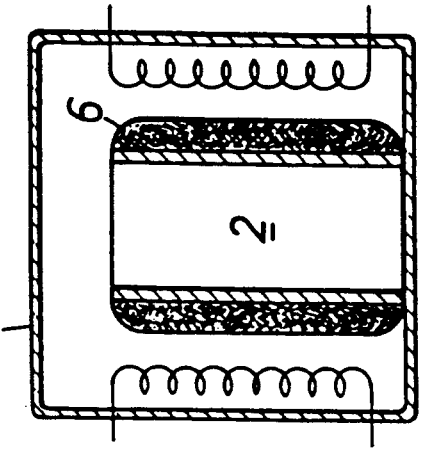
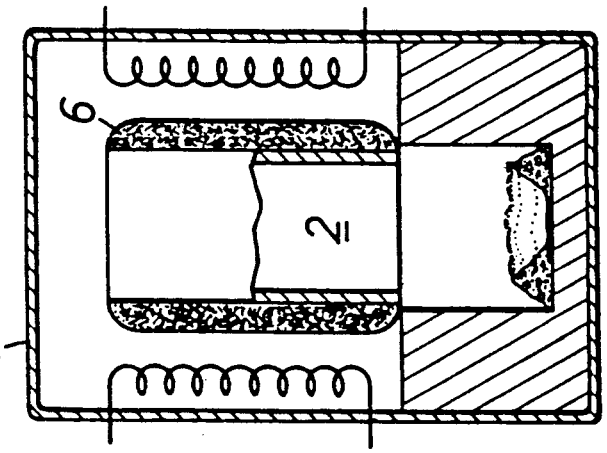
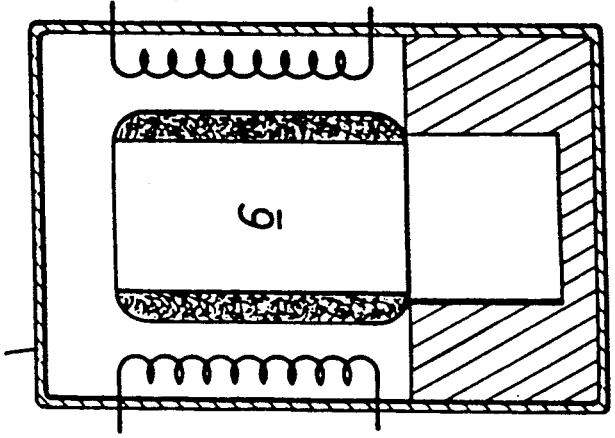

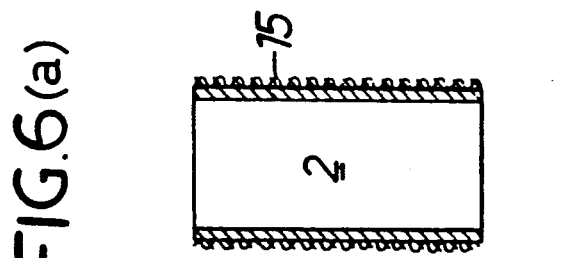
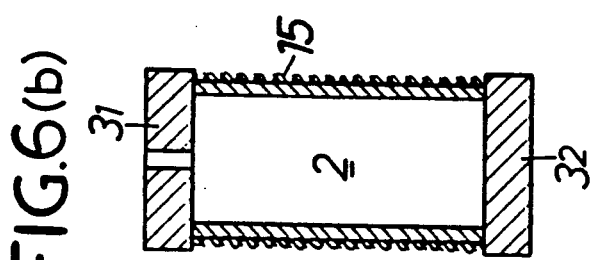
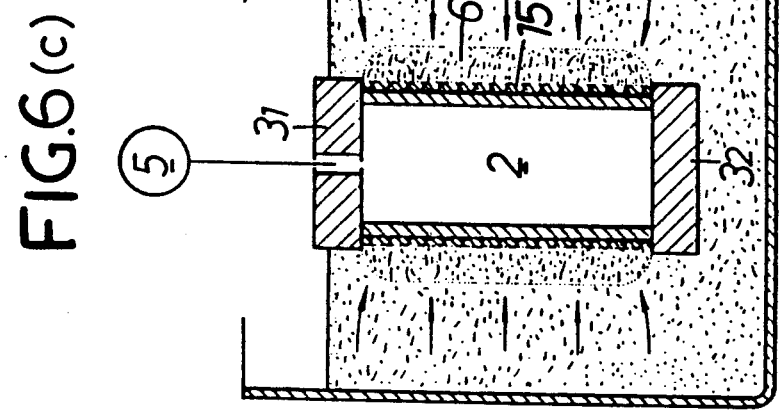
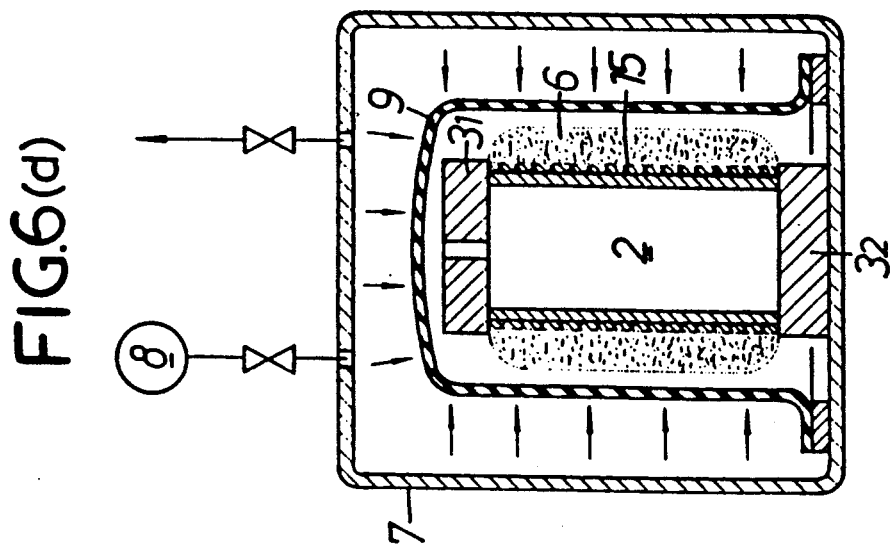

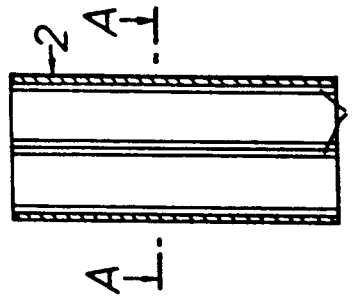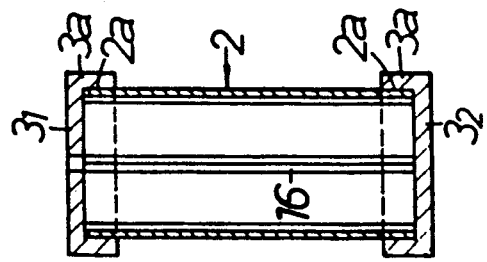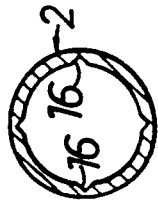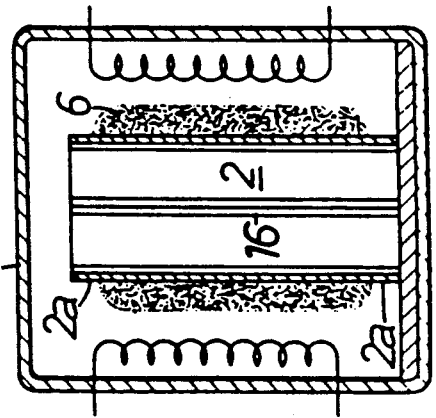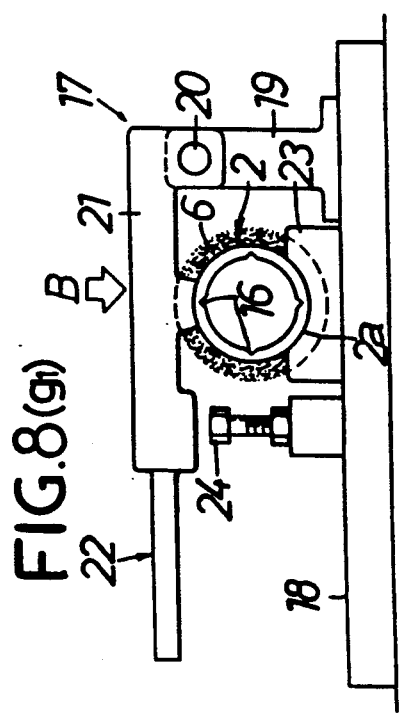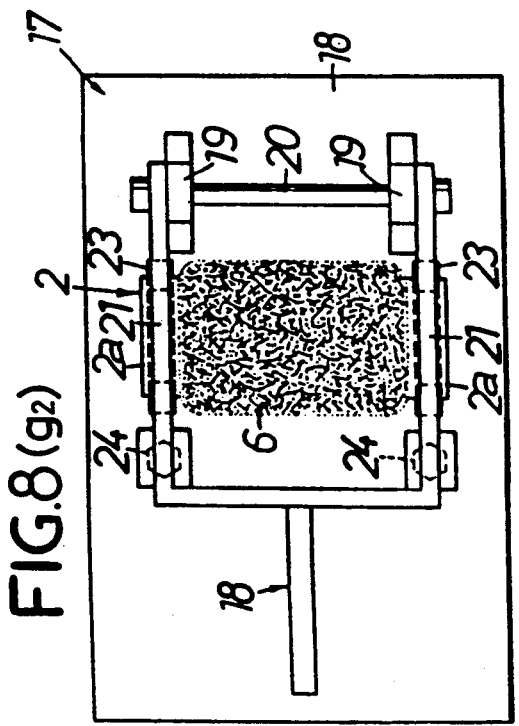

PROCESS FOR PRODUCING CYLINDRICAL REINFORCING FIBROUS MOLDING

BACKGROUND OF THE INVENTION

1. Field of the Invention

The present invention relates to a process for producing a cylindrical reinforcing fibrous molding or shaped body for use in the fiber-reinforcing of a metallic part.

2. Description of the Prior Art

Such a fibrous molding has conventionally been produced by the steps of sealing the openings at the opposite ends of a porous cylindrical mold, immersing the mold into an aqueous solution of a molding material containing reinforcing fibers and an inorganic binder and depositing the molding material onto the outer peripheral surface of the mold by applying suction within the mold to form a molding blank; pressing the molding blank against the mold to adjust the shape of the molding blank; opening the openings at the opposite ends of the mold and withdrawing the mold from the molding blank; heating and drying the molding blank; and heating the molding blank to partially bond the reinforcing fibers with the inorganic binder.

However, the above process is accompanied by a problem, namely, if the mold is withdrawn from the molding blank before the heating and drying of the molding blank, the molding blank contains a large amount of water and has poor shape retention. Therefore, the molding may be deformed causing deterioration in the dimensional accuracy of the resultant fibrous molding.

SUMMARY OF THE INVENTION

It is an object of the present invention to provide a process for producing a cylindrical reinforcing fibrous molding, wherein deformation of the molding blank can be prevented so that a fibrous molding having good dimensional accuracy can be produced.

It is another object of the present invention to provide a process for producing a cylindrical reinforcing fibrous molding, in which the step of withdrawing the mold can be excluded.

To accomplish the above objects, according to the present invention, there is provided a process for producing a cylindrical reinforcing fibrous molding, which comprises the steps of: sealing the openings at opposite ends of a porous cylindrical disintegratable mold, immersing the mold into an aqueous solution of a molding material containing reinforcing fibers and an inorganic binder, and depositing the molding material onto the outer peripheral surface of the mold by applying suction within the mold to form a molding blank; pressing the molding blank against the mold to adjust the shape of the molding blank; heating and drying the molding blank; disintegrating the mold and removing the same from the molding blank; and heating the molding blank to partially bond the reinforcing fibers with the inorganic binder.

In addition, according to the present invention, there is provided a process for producing a cylindrical reinforcing fibrous molding, which comprises the steps of: sealing the openings at the opposite ends of a porous, cylindrical mold which is disintegratable by heating at a high temperature, immersing the mold into an aqueous solution of a molding material containing reinforcing fibers and an inorganic binder, and depositing the molding material onto the outer peripheral surface of the mold by applying suction within the mold to form a molding blank; pressing the molding blank against the mold to adjust the shape of the molding blank; heating and drying the molding blank at a temperature lower than the temperature of disintegration of the mold; heating the mold to a temperature higher than the disintegration temperature to disintegrate the mold and removing it from the molding blank; and heating the molding blank to partially bond the reinforcing fibers with the inorganic binder.

Further, according to the present invention, there is provided a process for producing a cylindrical reinforcing fibrous molding, wherein use is made of a mold whose outer peripheral surface is covered with a thin, permeable film which will be completely burnt off at the temperature of disintegration of the mold.

Yet further, according to the present invention, there is provided a process for producing a cylindrical reinforcing fibrous molding, which comprises the steps of: fitting a rigid hollow core including a number of vent holes in a peripheral wall thereof into a porous, cylindrical mold having a relatively thin wall so as to be completely disintegratable in a heating condition at a high temperature, sealing openings at opposite ends of the mold and the hollow core, then immersing the mold and the hollow core into an aqueous solution of a molding material containing reinforcing fibers and an inorganic binder, and depositing the molding material onto the outer peripheral surface of the mold by applying suction within the mold to form a molding blank; pressing the molding blank against the mold to adjust the shape of the molding blank; withdrawing the hollow core from the mold; heating and drying the molding blank at a temperature lower than the temperature of disintegration of the mold; heating the mold to a temperature higher than the disintegration temperature to completely disintegrate the mold; and heating the molding blank to partially bond the reinforcing fibers with the inorganic binder.

Further, according to the present invention, there is provided a process for producing a cylindrical reinforcing fibrous molding, which comprises the steps of: sealing openings at opposite ends of a porous cylindrical mold formed from a shell sand, covering the outer peripheral surface of the mold with a thin film having permeability, immersing the mold into an aqueous solution of a molding material containing at least carbon fibers and an inorganic binder, and depositing the molding material onto the outer peripheral surface of the mold through the thin film by applying suction within the mold to form a molding blank; pressing the molding blank against the mold to adjust the shape of the molding blank; heating and drying the molding blank; placing the mold into a furnace maintained in an air atmosphere to completely burn off the thin film and completely disintegrate the mold by maintaining the temperature within the furnace in a range of 330° to 480° C.; and heating the molding blank in an inert gas atmosphere to partially bond the carbon fibers with the inorganic binder.

Further, according to the present invention, there is provided a process for producing a cylindrical reinforcing fibrous molding, which comprises the steps of: sealing openings at opposite ends of a porous cylindrical mold which is disintegratable by applying a pressing force to the outer peripheral surface at least at one end thereof and covering the outer peripheral surface at said one end, then immersing the mold into an aqueous solution of a molding material containing reinforcing fibers and an inorganic binder, and thereafter depositing the molding material onto the outer peripheral surface excluding the covered portion of the mold by applying suction within the mold to form a molding blank; pressing the molding blank against the mold to adjust the shape of the molding blank; heating and drying the molding blank; applying a pressing force to the outer peripheral surface at said one end of the mold which has been not subjected to the deposition of the molding material due to the covering thereat to disintegrate the mold; and heating the molding blank to partially bond the reinforcing fibers with the inorganic binder.

In the above processes, the mold is disintegrated and removed after heating and drying the molding blank and therefore, the deformation of the molding blank can be prevented to provide good dimensional accuracy for the fibrous molding, and the mold withdrawing step can also be excluded to improve production efficiency.

In the above processes, the removal of the mold can be extremely easily conducted because of the use of a mold which is disintegratable by heating at a high temperature.

In addition, since the mold has a thin wall, the suction of the molding material can be efficiently carried out in forming the molding blank, and this forming operation can be rapidly effected. In this case, the mold can be prevented from being broken during the steps of forming the molding blank and adjusting the shape thereof even if it has a thin wall, because the rigid hollow core has been fitted in the mold.

Since the molding blank is heated and dried after the hollow core has been withdrawn from the mold, the mold cannot be broken and the molding blank cannot be deformed due to thermal expansion of the hollow core. In this case, the withdrawing of the hollow core cannot produce a variation in the shape of the molding blank, because such withdrawing is from the mold rather than from the molding blank.

In the above processes, it is possible to prevent generation of cracks in the molding blank due to thermal expansion of the mold and to prevent the mold material from being deposited and remaining on the molding blank by interposing the thin film, which will be completely burnt off at the temperature of disintegration of the mold, between the molding blank and the mold, thus providing a good quality fibrous molding.

Since the disintegration of the mold is conducted in an air atmosphere, the cost of such treatment can be reduced and moreover, a loss in quantity of the carbon fibers as the reinforcing fiber can be prevented by establishing the temperature within the furnace in the disintegrating treatment at a specific level and by effecting the heating of the molded blank in an inert gas atmosphere.

In the above processes, the pressing force which is applied to the outer peripheral surface at least at one end of the mold after heating and drying of the molding blank to completely disintegrate the mold leads to the removal of the mold simply and reliably without deformation of the molding blank.

The above and other objects, features and advantages of the invention will become apparent from a reading of the following detailed description of the preferred embodiments with reference to the accompanying drawings.

BRIEF DESCRIPTION OF THE DRAWINGS

FIG. 1 is a perspective view of a fibrous molding produced according to the present invention;

FIGS. 2(a) to 2(h) diagrammatically illustrate a process for producing a fibrous molding according to a first embodiment of the present invention;

FIGS. 3 (a1), 3(a2), 3(a3), 3(e) and 3(g, h) diagrammatically illustrate details of a process for producing a fibrous molding according to a second embodiment of the present invention;

FIGS. 4 to 7 are directed to a third embodiment of the present invention, wherein FIG. 4 is a bar graph illustrating the relationship between temperature within a furnace and % disintegration of a mold;

FIG. 5 is a graph illustrating the relationship between heating temperature and weight of carbon fiber;

FIGS. 6(a) to 6(h) diagrammatically illustrate the process for producing a fibrous molding according to the third embodiment; and FIG. 7 is a graph illustrating the relationship between time and temperature within a furnace for drying, disintegration and firing; and FIG. 8(a1), 8(a2), 8(b), 8(f), 8(g1) and 8(g2) diagrammatically illustrate the details of a process for producing a fibrous molding according to a fourth embodiment; wherein:

FIG. 8(a2) is a sectional view taken along line A—A in FIG. 8(a1); and

FIG. 8(g2) is a view taken in the direction of arrow B in FIG. 8(g1).

DETAILED DESCRIPTION OF THE PREFERRED EMBODIMENTS

Figure 4:
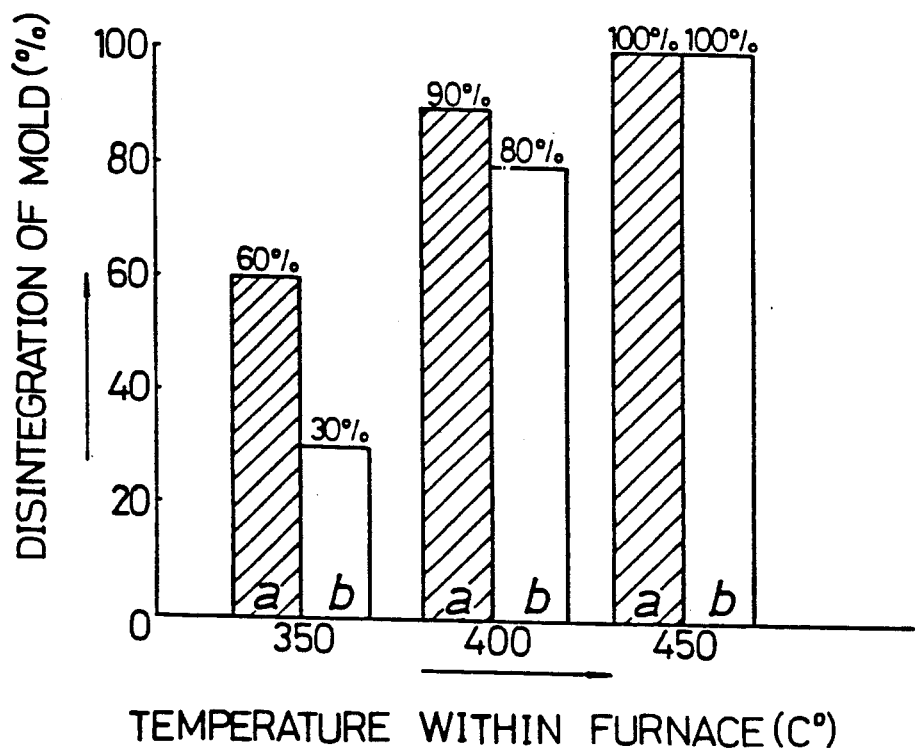

Referring to FIG. 1, there is shown a cylindrical reinforcing fibrous molding 1 which is formed from mixed short fibers consisting of carbon fibers and alumina fibers and partially bonded with a silica sol, an alumina sol or a mixed sol thereof serving as a binder and which has a large number of voids into which a matrix may penetrate. In the fibrous molding 1, the volume fraction (Vf) of the carbon fibers is, for example, in the range of 6 to 9%, and that of the alumina fiber is, for example, in the range of 12 to 19%.

The fibrous molding 1 is used, for example, to provide a fiber-reinforced composite cylinder sleeve filled with an aluminum alloy matrix in producing an 15 aluminum alloy cylinder block in a casting process. In this case, the carbon fiber contributes primarily to an improvement in the sliding characteristic of the inner peripheral surface of the cylinder sleeve due to its lubricity, while the alumina fiber contributes primarily to an improvement in the strength of the wall of a cylinder bore.

A process for producing the fibrous molding 1 will now be described with reference to FIGS. 2(a) to 2(h) illustrating the first embodiment of the present invention.

As shown in FIG. 2(a), a porous, cylindrical mold 2 is formed of shell sand (AFS particle size of 35). The mold 2 has an outside diameter of 75 mm, a thickness of about 5 mm and a crushing strength of 65 kg/cm². The mold 2 also has the property of being disintegrated when heated to a high temperature of 350° to 400° C., because it is formed of the shell sand.

As shown in FIG. 2(b), holders 3₁ and 3₂ are attached to openings at opposite ends of the mold 2 by means of adhesive bonding or bolting.

As shown in FIG. 2(c), the mold 2 is immersed into an aqueous solution of a molding material containing mixed carbon/alumina fibers and an alumina sol, and a suction is applied to the interior of the mold 2 by a suction pump 5 to deposit the molding material onto the outer peripheral surface of the mold 2 with a predetermined thickness, thereby forming a molding blank 6. The forming operation by use of the suction pump 5 is conducted for approximately 2 minutes.

As shown in FIG. 2(d), the mold 2 is placed into a pressure vessel 7 of a rubber membrane press, and pressurized air is supplied from an air pressure source 8 into the pressure vessel 7 to press the molding blank 6 against the outer peripheral surface of the mold 2 by a rubber membrane 9 with a pressure of 8 to 10 kg/cm², thereby adjusting the shape of the molding blank 6, while at the same time determining its density.

As shown in FIG. 2(e), both the holders 3₁ and 3₂ are removed from the mold 2.

As shown in FIG. 2(f), the mold 2 is placed into a drying furnace 10, and the molding blank 6 is subjected to a drying treatment at 120° C. for one hour to remove water.

As shown in FIG. 2(g), the mold 2 is placed into a firing furnace 11 and subjected to a disintegrating treatment at 350° to 400° C. for one hour. This disintegrating treatment causes the mold 2 to be disintegrated by approximately 50%. The remaining mold portion is broken away by applying vibration or other means, and the molding blank 6 is not deformed under this condition, because it has been dried and has satisfactory shape retention. In addition, because a substantial number of cracks have been produced in the remainder of the mold 2, the removal thereof is easily conducted.

As shown in FIG. 2(h), only the molding blank 6 then remains in the firing furnace 11 and it is subjected to a firing treatment at 800° C. for one hour. This causes the mixed short fibers to be partially bonded with the alumina sol to provide the fibrous molding as shown in FIG. 1. To disintegrate 100% of the mold 2, its thickness may be 2.5 mm, i.e. one half of that in the above embodiment, but such a reduced thickness causes the formed mold 2 to have a reduced strength and it is apt to be broken in the molding blank forming step or in the rubber press. By making the thickness of the mold 2 approximately 5 mm as described above, it is possible to prevent the mold 2 from being broken in the molding blank forming step and to achieve disintegration of approximately 50% of the mold by the disintegrating treatment.

FIGS. 3(a1), 3(a2), 3(a3), 3(e) and 3(g, h), illustrate a second embodiment of the present invention.

FIG. 3(a1) shows a porous cylindrical mold 2 formed from a shell sand (AFS particle size of 35). The mold 2 has an outside diameter of 75 mm, a thickness of about 2.5 mm, i.e. one half of that in the first embodiment, and a crushing strength of 40 kg/cm². The mold 2 also has the property that it is completely disintegrated when heated to a temperature of 350° to 400° C., because it is formed of the shell sand and is thin.

FIG. 3(a2) shows a hollow core 12 which has a plurality of annular grooves 13 in the outer surface of the wall thereof and a number of vent holes 14 extend from the bottom surfaces of the individual annular grooves into the inner surface of the wall.

The hollow core 12 is formed of an aluminum alloy and therefore has rigidity. The hollow core also has a draft of approximately 30 minutes on its outer peripheral surface.

As shown in FIG. 3(a3), the hollow core 12 is fitted in the mold 2.

Thereafter, the mold 2 is subjected to the steps shown in FIGS. 2(b) to 2(e) to form a molding blank 6.

During forming of the molding blank 6, the suction on the molding material is conducted with a good efficiency, because the mold 2 is thin, and this forming operation by use of the suction pump 5 may be for a period of time as short as approximately one minute. The thin mold cannot be broken in the steps of forming the molding blank 6 and adjusting the shape thereof, because it has been reinforced with the hollow core 12.

As shown in FIG. 3(e), the hollow core 12 is withdrawn from the mold 2. In this case, the withdrawal of the hollow core 12 is easily achieved because of the aforesaid draft, and since force is not applied to the molding blank 6, the latter is not deformed.

After the drying step shown in FIG. 2(f), the mold 2, as shown in FIG. 3 (g, h), is placed into the firing furnace 11 and subjected to a disintegrating treatment at 350° to 400° C. for one hour. This disintegrating treatment causes the mold 2 to be completely disintegrated, because the mold 2 is thin.

Subsequently, the molding blank 6 is subjected to a firing treatment at 800° C. for one hour. This causes the mixed short fibers to be partially bonded with the alumina sol to provide the fibrous molding 1 as shown in FIG. 1.

FIGS. 4 to 7 illustrate a third embodiment of the present invention.

In the third embodiment, the mold 2 is formed as a porous cylindrical body of shell sand (AFS particle size of 35) as in the first embodiment. The mold 2 has an outside diameter of 75 mm, a thickness of about 5 mm and a crushing strength of 65 kg/cm².

FIG. 4 illustrates the relationship between the temperature within the furnace and the % disintegration of the mold 2. The % disintegration of the mold 2 is given by $(w1/W2) \times 100$. In FIG. 4, the reference character $a$ indicates the % disintegration obtained in the case where the mold 2 was maintained in the firing furnace for 60 minutes, and the reference character $b$ indicates the % disintegration obtained in the case where the mold 2 was maintained in the firing furnace for 30 minutes.

It can be seen from FIG. 4 that in order to disintegrate 100% of the mold 2, it is necessary to set the temperature within the furnace at 450° C. or more.

In this case, because the temperature at which a phenolic bonding agent contained in the shell sand will be decomposed is 320° to 360° C. and the decomposition of the phenolic bonding agent is an exothermic reaction, the temperature of the mold 2 is the temperature within the furnace plus the heat generated with the decomposition of the phenolic bonding agent.

Figure 5:
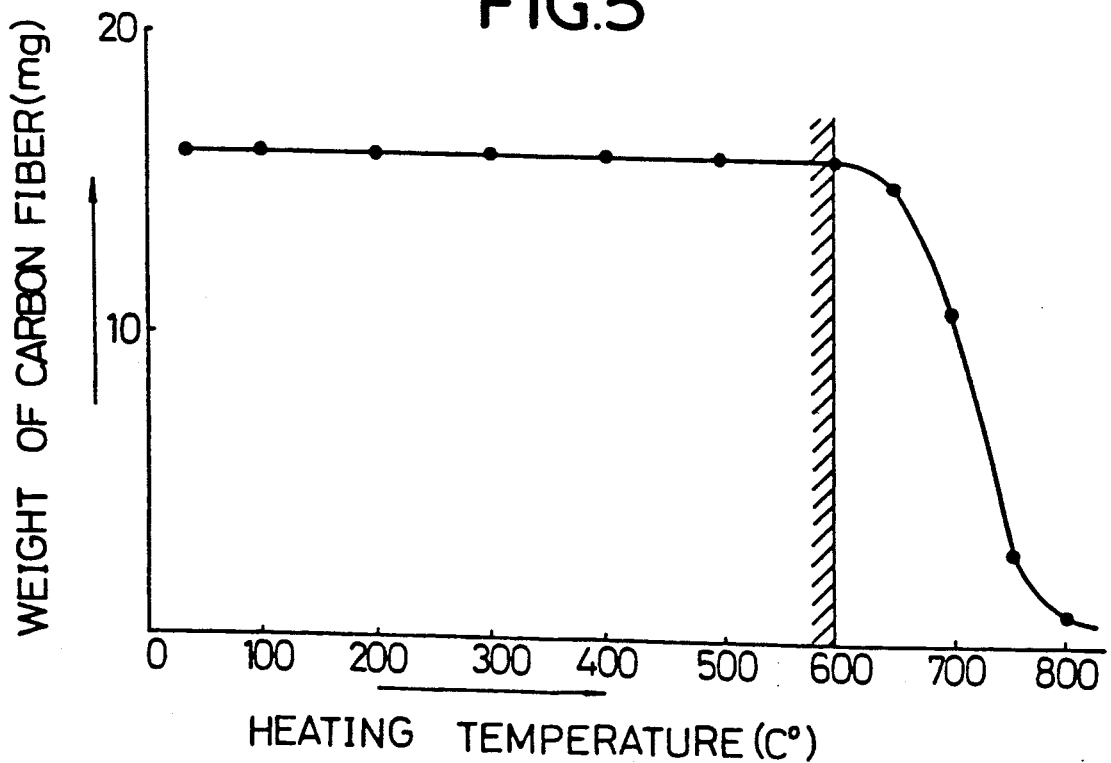

FIG. 5 illustrates the relation between heating temperature of the carbon fiber in the atmosphere and its variation weight with oxidation of the carbon fiber. It can be seen from FIG. 5 that if the carbon fiber is heated to a temperature exceeding 600° C., it rapidly decreases in weight.

Thereupon, for the purpose of preventing decrease in weight of the carbon fiber with the oxidation thereof, an upper limit of the temperature within the furnace is set at a level of 600° C. − 120° C. = 480° C., and the lower limit of the temperature within the furnace, as a minimum temperature required for disintegration of the mold 2, is set at 450° C. −120° C. = 330° C.

A process for producing a fiber molding 1 as described above will now be described with reference to FIGS. 6 and 7.

As shown in FIG. 6(a), the entire outer peripheral surface of the mold 2 is covered with a thin permeable film 15 which will be completely burnt off at a temperature of disintegration of the mold 2, e.g., a thin stretchable fabric knitted of 6-nylon with a thickness of 0.10 mm.

As shown in FIG. 6(b), holders $3_1$ and $3_2$ are attached to openings at opposite ends of the mold 2 by adhesive bonding, bolting or other means to seal these openings.

As shown in FIG. 6(c), the mold 2 is immersed into aqueous solution 4 of molding material containing mixed carbon/alumina fibers and an alumina sol, and a suction is applied to the interior of the mold 2 by the suction pump 5 to deposit the molding material onto the outer peripheral surface of the mold 2 through the thin fabric 15 with a predetermined thickness, thereby forming molding blank 6. The forming operation by the suction pump 5 is conducted for approximately 2 minutes.

As shown in FIG. 6(d), the mold 2 is placed into the pressure vessel 7 of the rubber membrane press, and pressurized air is supplied from the air pressure source 8 into the pressure vessel 7 to press the molding blank 6 against the outer peripheral surface of the mold 2 with a pressure of 8 to 10 kg/cm$^2$, thereby adjusting the shape of the molding blank 6 while at the same time determining the fiber volume fraction.

In this case, the mold 2 is slightly contracted by the pressing force, but wrinkles cannot be produced in the thin fabric 15, because the thin fabric 15 follows the contracting motion due to its shrinking effect. Consequently, the inner peripheral surface of the molding blank 6 can be prevented from being roughened by the formation of wrinkles. After the aforesaid pressing force has been released, the mold 2 returns to the original state. This does not produce any interference, because the thin film 15 is stretched.

Figure 6E:
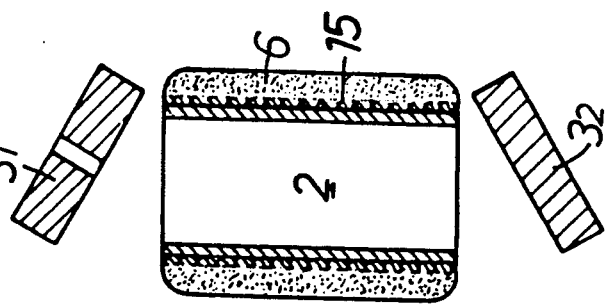

As shown in FIG. 6(e), both the holders $3_1$ and $3_2$ are removed from the mold 2.

Figure 6F:
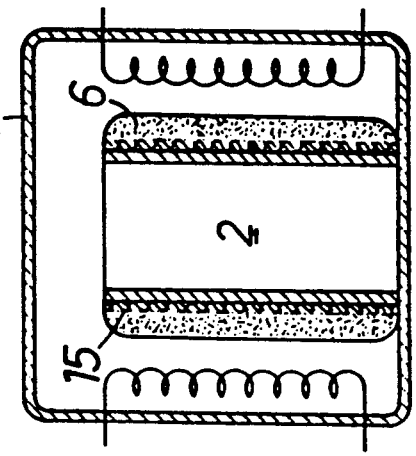
Figure 7:
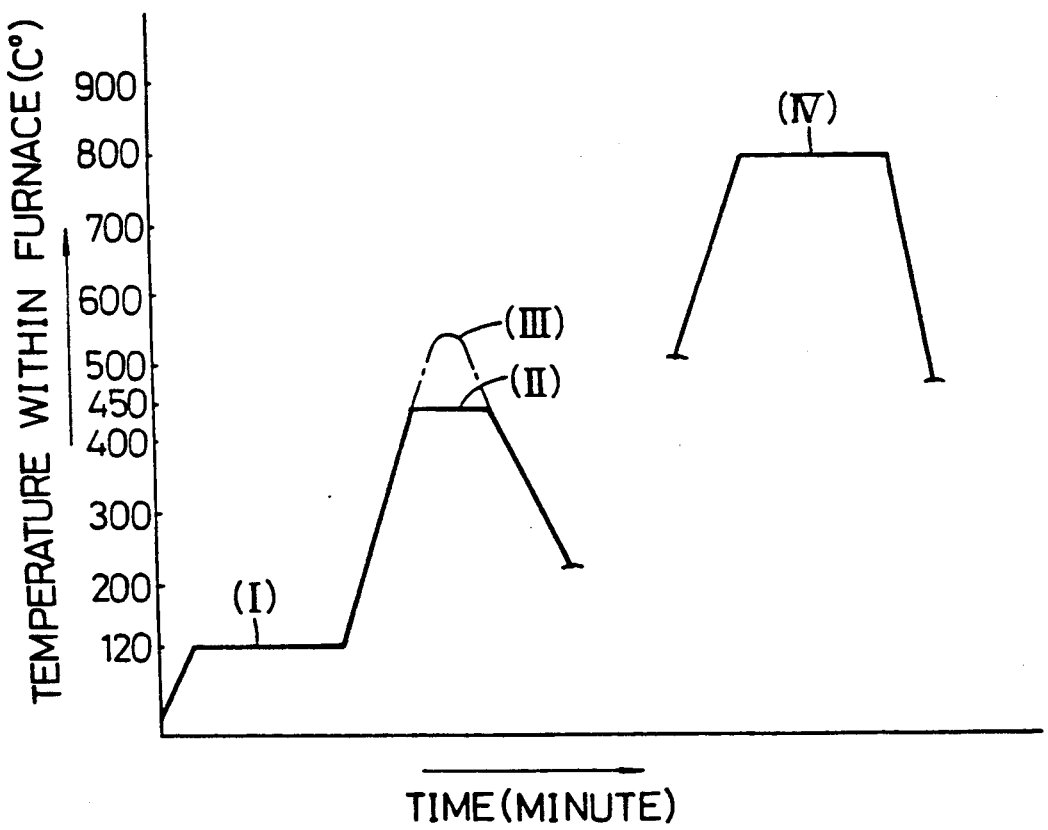

As shown in FIG. 6(f) and represented by line (I) in FIG. 7, the mold 2 is placed into the drying furnace 10 maintained in an air atmosphere, and the molding blank 6 is subjected to a drying treatment at 120° C. for 60 minutes to evaporate the water. During this heating and drying treatment, the thin fabric 15 starts to be burnt off. Also, the mold 2 is expanded, but cracks are not produced in the molding blank 6 due to the expansion of the mold 2, because the amount of mold expansion is absorbed by voids produced from the burning-off of the portion of the thin fabric 15 and by the buffering action of the remainder of the thin fabric 15.

Figure 6G:
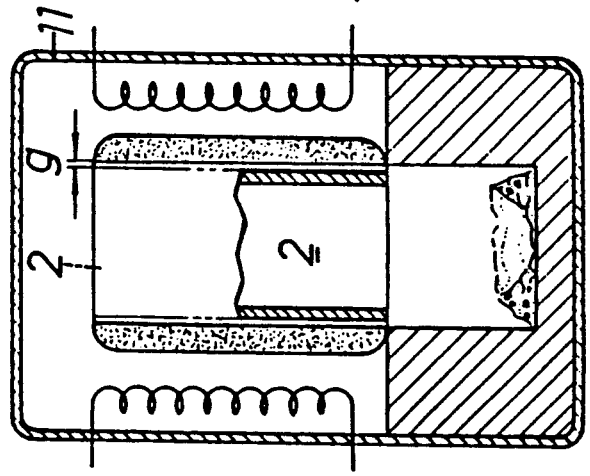

As shown in FIG. 6(g) and represented by line (II) in FIG. 7, the mold 2 is placed into the firing furnace 11 maintained in an air atmosphere and subjected to a disintegrating treatment at 450° C. for 30 minutes, so that the thin fabric 15 is completely burnt off in the course of raising the temperature. This disintegrating treatment causes 100% of the mold 2 to be disintegrated.

In FIG. 7, broken line (III) indicates a variation in temperature of the mold 2. The temperature of the mold 2 increases above that within the furnace due to the heat generated by the decomposition of the phenolic bonding agent in the shell sand, but because the mold temperature is of the order of 545° C. as a maximum, the carbon fibers cannot decrease in weight.

The mold 2 is expanded prior to the disintegration thereof, but the amount of expansion of mold 2 is absorbed by voids g produced with the burning-off of the thin fabric 15 and hence, cracks cannot be produced in the molding blank 6 as described above.

In addition, because the molding blank 6 is in contact with the mold 2 through the thin fabric 15, the shell sand which is a component of the mold 2 cannot deposit and remain on the molding blank 6, thus ensuring that the inner peripheral surface of the molding blank 6 is smooth.

Figure 6H:
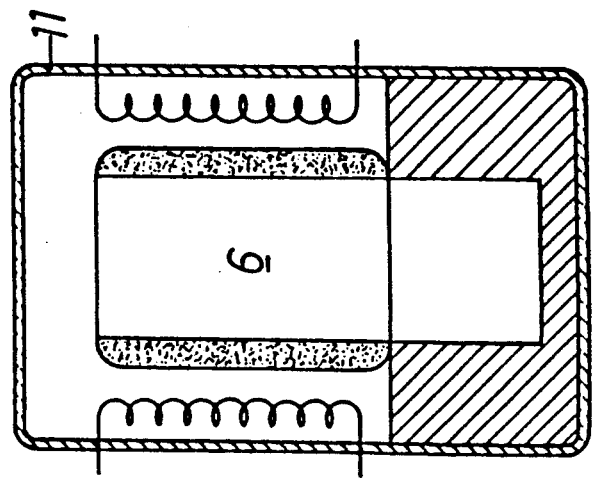

As shown in FIG. 6(h) and represented by line (IV) in FIG. 7, only the molding blank 6 is then placed into the firing furnace 11 maintained in an argon atmosphere and subjected to a firing treatment at a temperature of 800° C. within the furnace for 60 minutes. This causes the short mixed fibers to be partially bonded with the alumina sol to provide the fibrous molding 1 as shown in Fig. 1. In this case, because the firing treatment is conducted in the argon atmosphere, oxidation of the carbon fiber is avoided to prevent any decrease in weight thereof. It is to be noted that the argon may be replaced by another inert gas.

The above third embodiment is, of course, also applicable to the production of a fibrous molding containing only carbon fiber as the reinforcing fiber. For the aforesaid thin film 15, a thin paper can be used in addition to the thin fabric.

In the above third embodiment, the temperature of disintegration of the mold 2 may be in the range of 350° to 400° C. to disintegrate the mold 2 by 50%.

FIG. 8 illustrates a fourth embodiment of the present invention.

FIGS. 8(a1) and (a2) illustrate cylindrical porous mold 2 formed from shell sand (AFS particle size of 35). The mold 2 has an outside diameter of 75 mm and a thickness of 5 mm. A plurality of (four in the illustrated embodiment) grooves 16 having a V-shaped cross section are formed in the inner peripheral surface of the mold 2 at uniform distances circumferentially spaced apart to extend longitudinally over the entire length of the mold so that the crushing strength of the mold 2 is in the range of 45 to 50 kg/cm$^2$. Thus, if a pressing force exceeding the crushing strength is applied to the outer peripheral surface at least at one end of the mold 2 the bottom of each groove 16 is broken to cause the whole mold 2 to be completely disintegrated.

FIG. 8(b) illustrates the mold 2 covered at its outer peripheral surface at opposite ends thereof. More specifically, cap-like holders $3_1$ and $3_2$ are fitted over the outer peripheral surface 2a at the opposite ends of the mold 2 and each holder is attached thereto by adhesive bonding, bolting or other means to seal the openings at the opposite ends, whereby the outer peripheral surfaces at the opposite ends of the mold 2 are covered by a peripheral wall 3a of the holders $3_1$ and $3_2$.

Thereafter, the mold 2 is subjected to the steps shown in FIGS. 2(c) to (e) to form molding blank 6. In this case, since the outer peripheral surfaces 2a at 5 the opposite ends of the mold 2 have been covered by the holders 3₁ and 3₂, the deposition of the molding material thereon is avoided.

As shown in FIG. 8(f), the mold 2 is placed into the drying furnace 10, and the molding blank 6 is subjected to a drying treatment at 120° C. for one hour to remove water. The mold 2 cannot be disintegrated at this temperature, because it has been formed of the shell sand, and in addition, the mold 2 cannot produce a variation in size for the molding blank 6 because of its small thermal expansion coefficient.

FIGS. 8(g1) and (g2) illustrate a machine 17 for disintegrating the mold 2. The disintegrating machine 17 comprises a machine base 18, a pair of upright posts 19 mounted on the machine base 18 in opposed relation to each other, a support shaft 20 extending between both the posts 19, a pressing arm 22 mounted on the support shaft 20 for turning one end of each of a pair of pressing portions 21, a pair of support stands 23 fixedly mounted on the machine base 18 in an opposed relation to each other to support the mold 2, and a pair of pressing lever stoppers 24 similarly mounted on the machine base 18 in an opposed relation to each other.

In order to disintegrate the mold 2, the mold 2 is placed in the disintegrating machine 17 with its opposite ends 2a resting on the support stands 23, respectively, and the pressing lever 22 is operated to apply a pressing force, exceeding the aforesaid crushing strength, to outer peripheral surfaces 2a at the opposite ends. This pressing force causes the bottom of each of the cut grooves 16 to be broken, so that the whole mold 2 is completely disintegrated. In this case, the mold 2 15 is disintegrated in such a manner to be divided into approximately four pieces and hence, the removal thereof is easy. In addition, since the molding blank 6 has been dried, it cannot be deformed during the placing of the mold 2 in the disintegrating machine 17 and during disintegration thereof, and the handling of the molding blank 6 is also satisfactory.

After the disintegration treatment, the molding blank 6 is subjected to a firing treatment in the same manner as shown in FIG. 2(h) to provide the fibrous molding 1 as shown in FIG. 1.

It is to be understood that the disintegration of the mold 2 can be conducted by applying a pressing force to only the outer peripheral surface 2a at one end of the mold 2.

We claim:

1. A process for producing a cylindrical reinforcing fibrous molding, comprising the steps of:
   providing a cylindrical mold which is formed of shell sand, has air permeability and is disintegratable at a high temperature, said mold having opposite ends with openings, covering the outer peripheral surface of said mold with a thin film which has air permeability, sealing the openings at said opposite ends of the mold, immersing said mold into an aqueous solution of a molding material containing reinforcing fibers and an inorganic binder, and depositing said molding material onto said film on the outer peripheral surface of said mold by applying suction within said mold to form a molding blank;
   pressing said molding blank against said mold to adjust the shape of said molding blank;
   heating and drying said molding blank at a temperature lower than the temperature at which said mold is disintegrated;
   heating said mold to the disintegration temperature to disintegrate and remove the mold from the molding blank and completely burn off said film; and
   heating said molding blank to partially bond said reinforcing fibers with said inorganic binder.

2. A process for producing a cylindrical reinforcing fibrous molding according to claim 1, wherein the heating temperature for disintegration of said mold is in the range of 350° to 400° C.

3. A process for producing a cylindrical reinforcing fibrous molding according to claim 1, wherein said thin film is a thin stretchable fabric of 6-nylon.

4. A process for producing a cylindrical reinforcing fibrous molding, comprising the steps of:
   sealing openings at opposite ends of a porous cylindrical mold which is formed from a shell sand and has permeability, covering the outer peripheral surface of said mold with a thin film having permeability, immersing said mold into an aqueous solution of a molding material containing at least carbon fibers and an inorganic binder, and depositing said molding material onto the outer peripheral surface of said mold through said thin film by applying suction within said mold to form a molding blank;
   pressing said molding blank against said mold to adjust the shape of said molding blank;
   heating and drying said molding blank;
   placing said mold into a firing furnace in an air atmosphere to completely burn off said thin film and completely disintegrate said mold by heating the furnace to 330° to 480° C.; and
   heating said molding blank in an inert gas atmosphere to partially bond said carbon fibers with said inorganic binder.

5. A process for producing a cylindrical reinforcing fibrous molding according to claim 4, wherein said thin film is a thin stretchable fabric of 6-nylon.

6. A process for producing a cylindrical reinforcing fibrous molding according to claim 4 or 5, wherein said molding material consists of carbon and alumina fibers and an alumina sol.

7. A process for producing a cylindrical reinforcing fibrous molding according to claim 4 or 5, wherein said temperature within the furnace is 450° C.

8. A process for producing a cylindrical reinforcing fibrous molding, comprising the steps of:
   sealing openings at opposite ends of a porous cylindrical mold which is breakable by applying a pressing force to the outer peripheral surface at least at one end thereof, covering said outer peripheral surface at the one end, then immersing said mold into an aqueous solution of a molding material containing reinforcing fibers and an inorganic binder and thereafter, depositing said molding material onto the outer peripheral surface of said mold excluding the covered portion by applying suction within said mold to form a molding blank;
   pressing said molding blank against said mold to adjust the shape of said molding blank;
   heating and drying said molding blank;
   applying a pressing force to the outer peripheral surface at the one end of said mold which has not been subjected to the deposition of said molding material due to the covering of said one end to break the mold; removing the broken mold from the molding blank; and heating said molding blank to partially bond said reinforcing fibers with said inorganic binder.

9. A process for producing a cylindrical reinforcing fibrous molding according to claim 8, wherein said mold is formed from a shell sand and a plurality of longitudinal grooves of a V-shaped cross section are formed in the inner peripheral surface thereof at equal spacings therebetween and extend over the entire length of the mold.

10. A process for producing a cylindrical reinforcing fibrous molding according to claim 8 or 9, wherein the disintegration of said mold is effected by pressing the outer peripheral surface of said mold at said opposite ends.

* * * * *